June 30, 1942.　　　C. C. BAILEY　　　2,287,959
CHEMICAL GAS GENERATOR
Filed Sept. 20, 1940　　　3 Sheets-Sheet 1

Inventor
Charles C. Bailey
By Christian R. Nielsen
Attorney

June 30, 1942.    C. C. BAILEY    2,287,959
CHEMICAL GAS GENERATOR
Filed Sept. 20, 1940    3 Sheets-Sheet 2
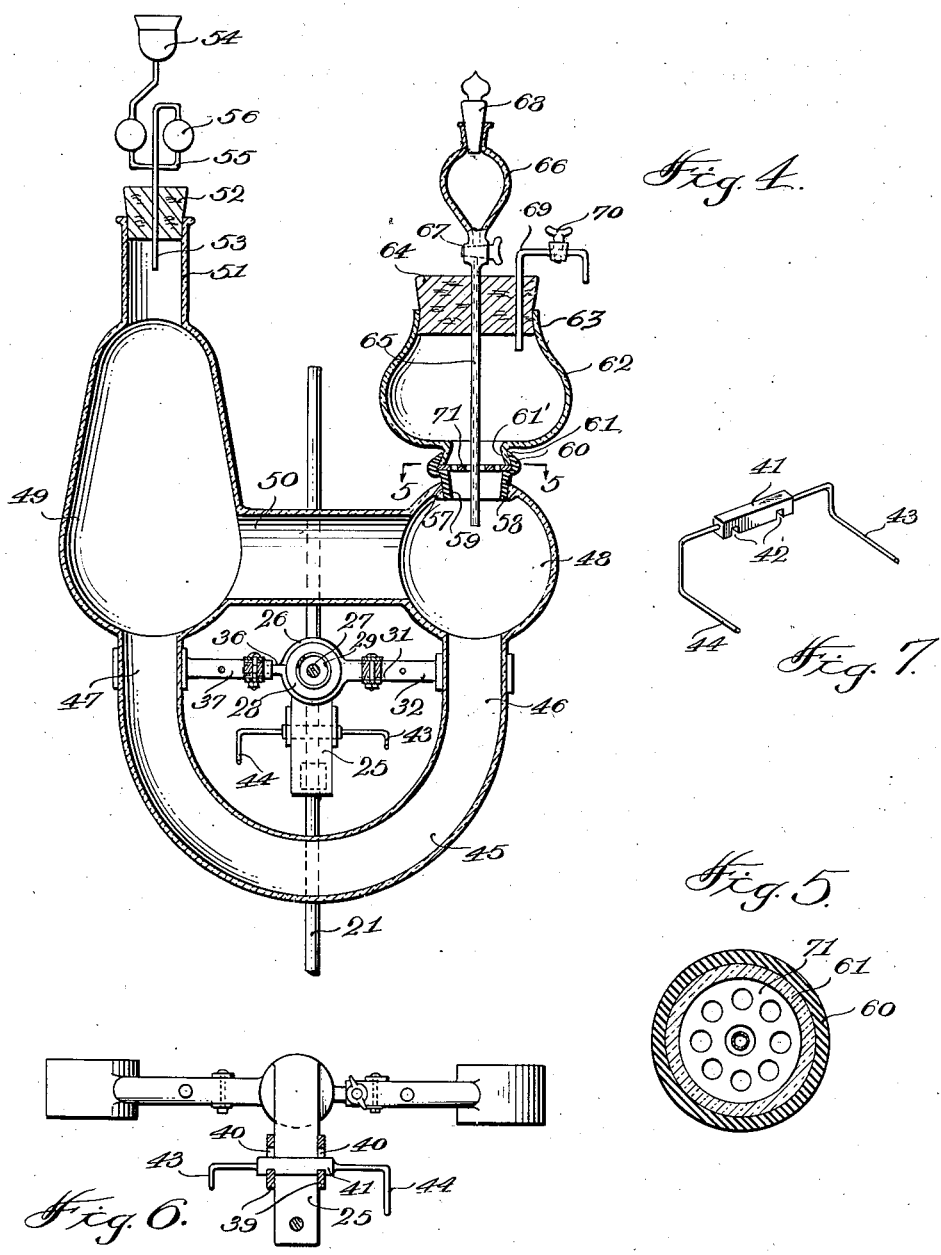
Inventor
Charles C. Bailey
By Christian R. Nielsen
Attorney

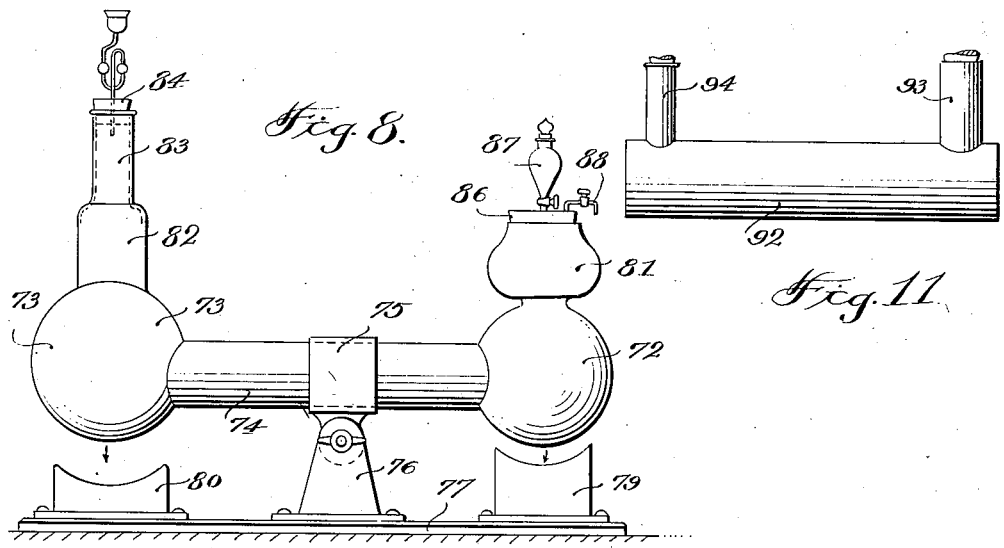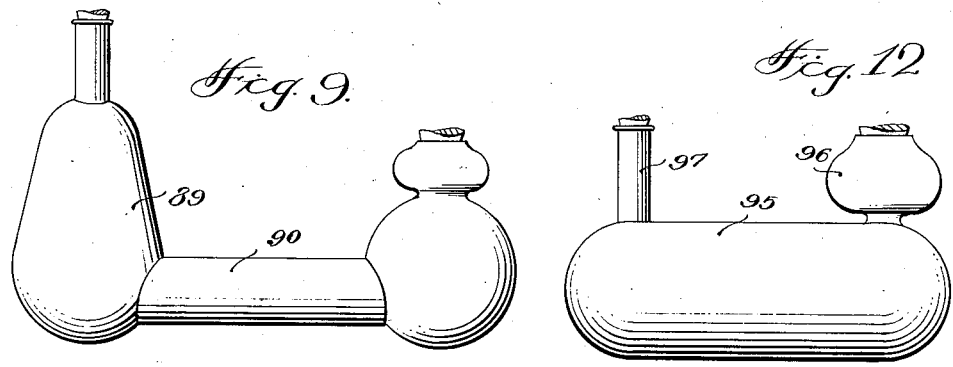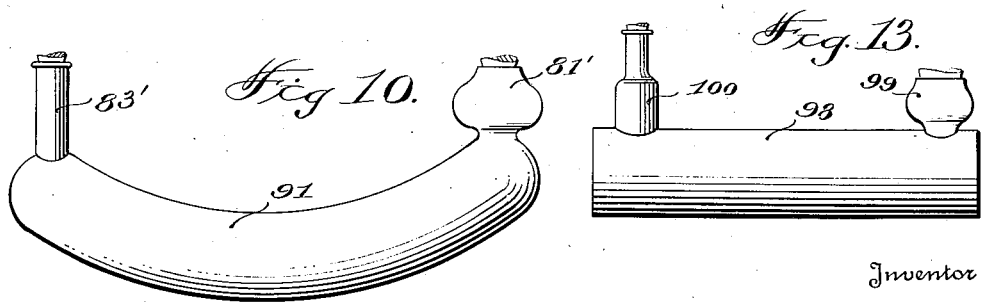

Patented June 30, 1942

2,287,959

UNITED STATES PATENT OFFICE 2,287,959

CHEMICAL GAS GENERATOR

Charles C. Bailey, Beverly Hills, Calif.

Application September 20, 1940, Serial No. 357,650

3 Claims. (Cl. 23—282)

The invention relates to a gas generating device especially suitable for laboratories, but applicable to commercial generation uses, as may be found desirable, and comprises a novel construction in chamber elements and the mounting thereof to the end of obtaining novel functions in such devices. The invention is especially applicable to use in laboratories for the generation of gas by the reaction of oxidizing agents on metals or other materials, or in the production of gases by the intermixture of various materials whereby the reaction of liquids on solids, reaction of gases on solids, and other processes are effected.

One of the more important specific uses to which the invention has been applied with great advantage is in the production of hydrogen sulphide, particularly as applied to use in systems of analysis, including those dealing with ores and metals where gaseous reagents are called into play. In prior apparatus a series of jars have been used, with a development in which a column of acid solution with a gas chamber thereover was coordinated with a valve to close the gas chamber at its outlet, so that gas accumulated would displace acid below a holder for the metal or other material from which the gas is being generated. This has been found to involve frequent accidents, due to leakage of the valve, or from loose parts, and undesired generation at times when the apparatus is not attended, occurs frequently by reason of slight jars to the apparatus, so that it has become necessary for laboratory workers to apply elastic rubber bandages to the parts to hold them in such position, involving much waste of time and clumsy apparatus. It is therefore an object of my invention to provide means for assuring safety of a generator of this kind when it is desired to stop generation while the reacting agents are present in the apparatus, but capable of generating the desired gas when the operator so desires.

It is an important aim of the invention to provide an apparatus of this kind which may be operated over extended periods without requiring frequent cleaning, and wherein the apparatus will operate with high efficiency.

It is an aim to attain a high degree of safety in the operation of such apparatus at the same time that the apparatus is made extremely simple in construction and liable in a minimum degree to derangement or deterioration. It is an especial aim to present such an apparatus which may be made in glass without requiring complicated glass blowing operations. It is also an aim to obviate the need for ground glass fittings to insure safety and accuracy of function of the parts of the device, and it is also an important aim to present such apparatus which may be made in a wide range of sizes, adapting it to the needs of small school laboratories, colleges or commercial laboratories, where extensive generating operations are necessary.

Another important aim is to present such an article which may be charged with expedition and with a minimum of difficulty or liability of faulty operation. Another important aim of the invention is to present apparatus for the purposes described, which may be easily cleaned, and which may be emptied of contents and recharged, without requiring removal from its stand. The invention as embodied also has the advantages that replacements and repairs may be effected at a minimum of cost. The apparatus may also be charged with the material to be oxidized while the acid solution is present in the apparatus with safety and certainty of absence of generation until the apparatus is manipulated additionally to initiate generation.

It is an especial advantage of the invention that it may be embodied in a form which may be produced at low cost and operated by persons of moderate experience, with a high degree of efficiency and satisfaction, as well as safety.

An important object of the invention is to present an automatic functioning generator of this kind, embodying at the same time the features of great safety when not in operation as well as in operation, in a field where there is great need for such apparatus having these advantages.

Additional objects, advantages and features of invention reside in the construction, arrangement and combination of parts involved in the embodiment of the invention, as will be readily understood from the following description and accompanying drawings, some of the important points involving improvements in the construction of the support in a form especially organized in relation to the form of the apparatus to attain novel functions, and wherein in certain aspects, the support and the apparatus are interdependent for the ends in view.

Referring more particularly to the drawings,

Figure 2 is a left-hand side view thereof.

Figure 4 is a vertical sectional view in the major plane of the apparatus, with the lower part of the stand omitted.

Figure 5 is a detail of the bottom of the generator cup.

Figure 6 is a detail front elevation of the bracket mounting for the retort apparatus.

Figure 7 is a perspective detail of the stop finger devices for limiting the tilting movement of the device, as will be described.

Figure 8 is a front elevational view of a modified construction of the apparatus and its mounting.

Figure 9 is a similar view of the body portion of a generator element in a further modified form.

Figure 10 is a similar view of a still further modification.

Figure 11 is a similar view of a fourth modification.

Figure 1:
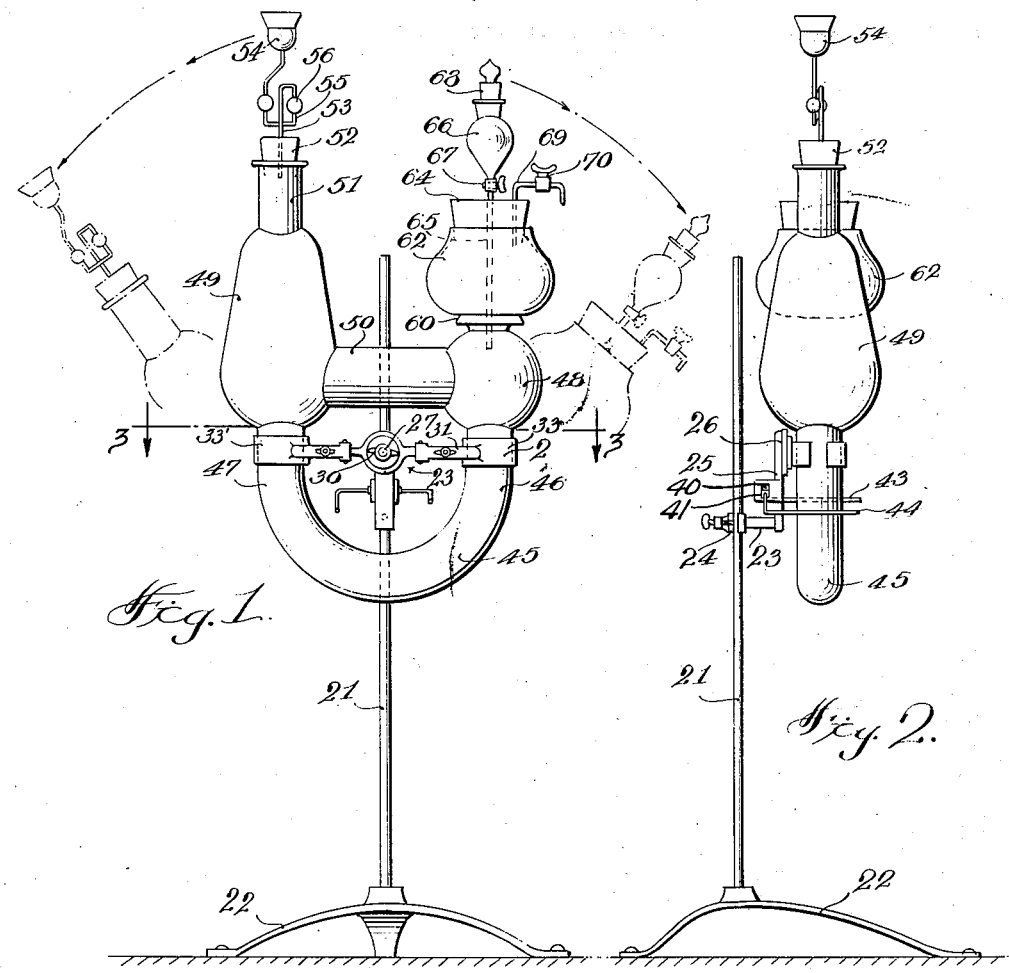
Figure 1 is a front elevation of the generating apparatus embodying the invention.
Figure 3:
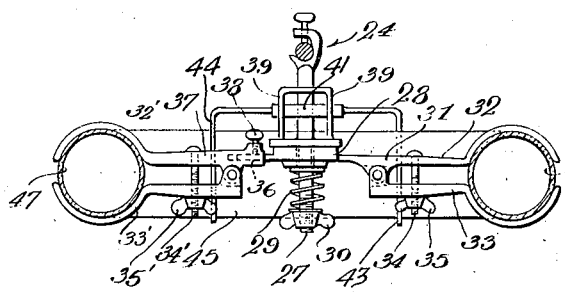
Figure 3 is an enlarged horizontal section on the line 3—3 of Figure 1.

Figure 12 similarly illustrates a fifth modification, while

Figure 13 presents a sixth modification in similar detail.

There is illustrated a conventional stand device including the vertical post 21 with an appropriate foot piece 22 supporting it rigidly in vertical position, although in place of such stand a bracket device for attachment to walls or other situations in which the article may be mounted may be substituted, as found desirable.

Vertically slidable upon the post 21, there is a bracket mounting consisting of a clamp portion 24 with a forwardly offset body portion extending vertically a short distance, at 25. This body portion formed at its upper part with a circular flange 26, from which there projects horizontally forward a pivot pin 27, threaded at its extremity for purposes to be described. Pivoted on this pin, there is a cross arm structure including a disc 28 revoluble on the pin, and pressed against the flange 25 by means of a spring 29 confined against the disc 28 by means of a wing nut 30, by which the pressure of the spring may be varied as desired, either to permit easy rotation of the disc on the pin, or to hold the disc more securely at adjusted positions. From one side of the disc there is extended an arm 31, which in the present instance, is made integral with the disc, although other practices may be followed, if desired, wherein the arm is adapted to be fixed rigidly with respect to the disc as required, and on the outer end of this arm there is formed a jaw 32, while pivoted on the arm there is a second jaw 33, a bolt 34 being co-engaged through the arm 31 and slidable in the last mentioned one, with a wing nut 35 thereon, by which the two jaws may be clamped together upon an interposed part of the apparatus to be subsequently described. In the present instance the jaws are formed with semi-circular outer parts whereby they may be brought together to embrace a cylindrical element and clamp the same firmly. At the opposite side of the disc, a short stud 36 is extended oppositely from the arm 31, and upon this stud there is slidable an extensible arm 37, corresponding to the one 31, and having integral and pivoted jaws 32′ and 33′ thereon secured by wing nuts and bolts 35′ and 34′, as in the first instance. The arm 37 has its base or inner portion formed as a sleeve slidable on the stud, and a binding screw 38 is engaged therethrough to impinge upon the stud to secure the arm in various extensional adjustments.

The bracket includes rearwardly projected, parallel, vertical, transversely spaced plates 39, in each of which there is formed a simple slot 40, the two being alined, and in these there is set for snug vertical sliding movement a rectangular bar 41 having two notches 42 in its lower side adapted to register with the plates 39, so that the edge portions at the lower end of the slot may enter the grooves of this bar and hold it against longitudinal sliding movement transversely of the plate. Projected from each end of this bar, there are stop arms 43 and 44, at the right and left, respectively, having horizontal forwardly projecting parts, the arm 43 being somewhat higher than the one 44. These are so disposed as to stop respective arms of the cross arm in rocking movement thereof on the pivot pin 27.

*The generator*

The generator to be mounted on this support as described comprises a U-shaped tube 45, of substantial diameter in proportions to the capacity of the apparatus, and in the specific embodiment shown in Figure 1 and Figure 4, where the device is adapted to the production of hydrogen sulphide, where 4000 cc. of $H_2SO_4$ are to be contained within the apparatus, the tube has been made two inches in diameter externally, with walls approximately one-eighth of an inch thick. The bend at the lower part of this tube has a radius of five inches in the size named, and the upper ends of the arms of the tube are extended for a short distance vertically sufficiently to permit the jaws 32 and 33, to 32′ and 33′ to engage snugly therearound, these jaws having a suitable vertical dimension to enable them to be clamped upon the arms of the tube safely for support of the apparatus with effectiveness in retaining the apparatus in proper position. It is desirable that the bend in the tube be concentric with the pivot pin 27, although this need not be extremely accurately established, and if desired, the pin may be otherwise located, particularly with reference to the center of the specific gravity of the apparatus, if this should be desired.

The tube as thus presented has a right arm 46 and left arm 47, as shown in Figures 1 and 4. At the upper end of the arm 46 a spherical chamber 48 is formed, while at the upper end of the arm 47 a substantially pear-shaped chamber 49 is formed, the arms communicating with these chambers and the two chambers are connected by a large normally horizontal tube 50, forming a communicating passage between the two chambers. It will be noted that the passage 50 is located with its axis coincident with the center of the chamber 48, but the chamber 49 extends a considerable distance thereabove, forming a bell portion, for a purpose which will be subsequently described. The upper part of the chamber 49 is formed with a neck portion 51 in which there is fitted a conventional stopper 52, in which a liquid-sealed vent tube 53 is engaged, formed with a nipple terminal 54, in accordance with conventional methods for such apparatus. The nipple tube fitting is formed with the usual trap loop 55, in the form of a U-tube with small chambers 56 in each arm, one being connected with the main portion of the tube 53 extending through the stopper, while the other is connected to the bottom of the thistle cup 54.

The chamber 48 is formed at its upper side with an opening 57, concentric with a vertical continuation of the axis of the right hand arm 46 of the tube 45. The sides of this opening are thickened to strengthen the material, and to receive a stopper element 58 tightly therein, this stopper element being formed with a central opening 59 therethrough and having a gradually attenuated laterally extended elastic cup 60 formed integrally thereon with a constricting lip 61 adapted to receive therein and to contract tightly around a flared mouth portion 61' of a gas chamber or cup 62, suitably enlarged at its lower part and formed with a large mouth 63 at its upper side, into which there is fitted a large frictional stopper 64 of conventional form. Set concentrically in this stopper there is an extension tube 65 of a separatory funnel 66, of conventional form, the tube extending downwardly through the stopper 58 a short distance into the chamber 48. The separatory funnel is provided with the usual cock valve 67 and stopper 68. Also set in the stopper 64, there is a gas vent tube 69 with pet cock 70 in its outer part.

Held in the elastic cup device 60, there is a foraminate disc 71, confined by the inherent elasticity of the cup and its contraction on the lower mouth 61', so that the disc is held against the mouth 61, as shown in Figure 4. The disc is formed with a central opening slightly larger than the tube 65, which extends loosely therethrough with a clearance preferably in the neighborhood of one-eighth of an inch, for use with iron sulphide to be subjected to the action of sulphuric acid, and the apertures additionally formed in the disc are preferably not more than one-eighth of an inch in diameter. The stopper 58 and the cup portion 60 are preferably so formed that small granular matter circulating through the apertures of the disc are free to move downwardly into the chamber 48 through the stopper 58, for the functions of the device to be subsequentially explained.

*Manner of operation*

In the use of this device as described, the support structure being assembled and engaged with the arms of the tube 45 as described, and the device being in normal erect position as illustrated in dotted lines in Figures 1 and 4, the stopper 64 with the parts assembled thereon, is removed from the mouth of the chamber 62, and a quantity of iron sulphide introduced into the cup 62 resting on the foraminate disc 71, a quantity of sulphuric acid is introduced, which may be poured through the neck 51 after removal of the stopper 52 and parts assembled thereon until the acid reaches an appropriate level above the disc 71. Generation begins at once by the reaction of the acid upon the compound in the cup, the gas evolved rising into the upper part of the cup, which is now closed with the stopper 64. The amount and nature of the liquid contained in the trap 55 will determine the pressure required to evacuate any gas or air which may stand over the acids in the bell chamber 49, and as soon as the generation of the gas in the cup 62 produces the necessary pressure, the valves 67 and 70 being closed, the liquid in the cup 62 will be displaced by the gas evolved until its level is lowered below that of the solid upon which the acid is acting, the acid being thereby caused to rise in the bell chamber 49 to permit this automatic function. As soon as the acid falls below the solid in the cup, generation ceases, and will not start ordinarily until the valve 70 is open to relieve or draw off gas from the cup 62. When the gas is sufficiently vented, the acid will again rise in the cup 62 by reason of the higher level of that standing in the bell chamber 49, and generation will be begun again.

In the operation of the device described, the formation of a sulphate solution in the cup and thereunder will result in the latter moving downwardly by reason of its greater specific gravity, displacing fresh acid from the tube 50 and chamber 49, by reason of the sulphate solution moving downwardly in the tube 45. This orbital movement will be quite active in initial stages of the operation, and will continue adequately until the acid is nearly exhausted. Incident to the action involved, the particles of sulphide in the cup will become reduced in size so that small granules thereof will fall through the opening in the disc 71 and through the stopper 58, so that part of the action will occur in the chamber 48 and possibly in the tube 45. However, the gas so evolved will be held in the chamber 48 by the orbital movement of the acid body entering from the tube 50 to the chamber 48, so that such gas evolved below the chamber 62 will rise into the chamber 62 through the stopper 58 and the disc 71. The evolution of gas by this method may be continued over a comparatively long period, and sulphate solution products may be allowed to remain in the apparatus diluting the acid progressively to such stage, as will be understood. At and advanced stage of exhaustion of the acid the automatic circulatory action may cease, but may be restored by loosening the wing nut 39, and oscillating the generator body from side to side, as indicated in Figure 1, and allowed to stand again in normal position when the action will continue for a considerable period further. Filling the separatory funnel 66 with fresh acid will permit introduction of acid to the solution below the cup 62 by operation of the cock 67, as required, enabling a more extended operation of the device without removal of the contents of the tube 45 and chambers and replenishment of acid in toto.

As will be seen, the device as thus described has the advantages of the automatic operation and cessation of generation by displacement of acid from the generating chamber by pressure developed therein by the generative gas when the gas is not drawn off or utilized. In case it is desired to close down the generator for any extended period when it is not convenient to watch it, generation may be positively guarded against by tilting the device to the left, as shown at A in Figure 1. This will lift the chamber 62 to such level that the acid cannot reach the contents of the cup 62 under action of gravity, and by carefully tightening the thumb-screw 39 the device will be securely held in such safety or non-generating position, secure against any possibility of accidental initiation of generation through vibration, opening of the valve 70, and/or of a number of other causes which have heretofore been found to initiate generation in prior devices when not desired. Even accidental opening of the cock 67 to admit acid will not cause beginning of generation if the size of the funnel 66 is governed in proportion to the capacity of the chambers 48 and 49.

The advantage of positive safety may be obtained by the utilization of my invention embodied in various other forms not shown in Figures 1 to 4, and in Figures 8 to 13, I have illustrated respective modifications of the apparatus which are possible while retaining the advantage of safety by the pivotal mounting of the apparatus. Thus, in Figure 8, two spherical chambers 72 and 73 are shown, connected by a horizontal tube 74, this tube 74 being held in a clamp 75 which is pivoted on a low bracket 76 mounted in turn upon a base 77, and being adapted to be secured in various pivoted positions by means of a thumb screw. A high rest 79 is provided under the right hand chamber 72, which corresponds to the chamber 48 before described, while a low rest 80 is provided under the chamber 73, permitting the latter to be moved downwardly to a greater extent than the chamber 72. A generator cup 81 is mounted over the chamber 72 in any approved fashion, in the present instance being shown integral therewith, while a suitable bell chamber 82 is formed on the chamber 73 with neck and stopper 83 and 84, and thistle cup 85 all functioning as before described. The chamber 81 may be provided with a stopper 86, separatory tube, and gas vent 88, corresponding to those before described. Any suitable support may be provided in the cup 81 for the solid reactants, in accordance with my disclosure. This device may be oscillated to agitate the contents and increase the rapidity of the reaction, as before described, and when it is desired to stop generation the device may be moved to safety position, with the chamber 73 on the low rest 80, when the cup 81 with the solid reactants will be lifted high above the liquid level of the liquid reactant in the chamber 72.

In Figure 9, there is shown a device adapted to be mounted in the same way as the device in Figure 8, with the exception that in place of the small chamber 73 a large pear-shaped chamber 89 is utilized, and a connecting tube 90 is connected near the bottom of both chambers.

In Figure 10, the device illustrated consists of a curved tubular chamber 91, with the end portions inclined upwardly toward their outer parts, a chamber 81' being formed at the upper end of the chamber 91 at one end, while a neck portion 83' is provided at the opposite end, the last named two elements to be utilized in the same manner as indicated in connection with Figure 8, while the essential portions of the chamber 91 may be secured in a clamp device similar to the one 75 and similarly mounted for rocking movement of the device.

In Figure 11 the form of the chamber is more simplified, being a simple rectilinear cylinder closed at the ends and having a lateral upwardly extending chamber 93 formed thereon at one end, which may be utilized as the chamber 81 last mentioned, or there may be set in its upper part a stopper mounted device such as that carried by the stopper 68 before described, while at the opposite end of the chamber 92 a neck element 94 is attached, but is utilized in the same manner as the neck 83 of Figure 8.

In Figure 12 the main chamber 95 is shown in a further form of considerable thickness in proportion to its length, and having on one end a generating chamber 96 corresponding to the one 81 last described and adapted to similar use, while a neck portion 97 is mounted on its opposite end for use in the manner described in connection with the neck 83 of Figure 8.

In Figure 13 a simple cylindrical horizontally arranged main chamber 98 is shown, having a generating chamber 99 thereon which may correspond to the chamber 81, before described, and at the opposite end a neck portion 100, its lower part enlarged to afford a bell chamber while the upper part corresponds to the neck portion 83.

It will be apparent that each of the devices shown in the modifications in Figures 8 to 13, respectively, are adapted to be mounted in any rocking clamp such as shown at 75 in Figure 8 to attain the functions of safety and manual agitation, introduction of acid or charging of the device with acid while the solid reactant is in place in the generator chamber, with safety and despatch.

It will be seen that all of these devices are adapted to be quickly demounted for cleaning when required, and are of such simple form that cleaning of the interior surfaces may be readily accomplished with a minimum of difficulty.

While I have described a specific construction of the invention with great particularity, it will be understood that this is purely exemplary, and that various changes in construction, arrangement, proportion of parts, substitution of materials, and substitution of equivalents may be carried out without departing from the spirit of the invention as set forth in the claims hereto appended.

I claim:

1. A device of the character described comprising a stand, a support device pivoted on a horizontal axis thereon, means to secure the support at adjusted positions on its axis, a generator on said support having a U-shaped tube in a vertical plane transverse to said axis, a cross conduit connection between its upper arm portions, a generator chamber mounted over one arm in communication therewith, and a displacement chamber mounted over the other arm in communication therewith, and normally extending above liquid level in the generator chamber, and an automatic vent device at the top of the second named chamber.

2. The structure of claim 1 in which the junctions of the said cross conduit with the U-shaped tube adjacent the generating chamber includes a junction chamber portion below the generating chamber and separate therefrom, a mouth being formed in the top of the junction chamber, the generating chamber having a flared mouth at its bottom, a stopper fitted in the mouth of the junction chamber and formed with a laterally enlarged elastic contractile lip engaged around the flared mouth, and a foraminate disc confined in the elastic lip against the flared mouth.

3. In a device of the character described, a stand including a bracket rockable on a horizontal axis, a generating device carried by the bracket having a generating chamber at one side of said axis and a displacement chamber at the opposite side of the axis, conduit communication being formed between the two, means to hold the bracket in adjusted positions on its axis, said conduit communication consisting of a substantially U-shaped tube having one arm normally extending upwardly beneath the generating chamber, and the other arm connected to the displacement chamber, and a cross arm conduit connecting the two arms, the normal liquid level in the generating chamber being medially of the height of the displacement chamber, and means on the stand for limiting rocking movement of the device whereby the generating chamber is checked at a higher limit than the displacement chamber.

CHARLES C. BAILEY